United States Patent [19]

Darlington et al.

[11] Patent Number: 5,025,362

[45] Date of Patent: Jun. 18, 1991

[54] COORDINATE POSITIONING SYSTEM

[75] Inventors: Alan D. Darlington, Dursley, United Kingdom; Kevin P. Waggitt, Etobicoke, Canada

[73] Assignee: Renishaw plc, Gloucestershire, United Kingdom

[21] Appl. No.: 216,541

[22] PCT Filed: Nov. 6, 1987

[86] PCT No.: PCT/GB87/00787

§ 371 Date: Aug. 10, 1988

§ 102(e) Date: Aug. 10, 1988

[87] PCT Pub. No.: WO88/03672

PCT Pub. Date: May 19, 1988

[30] Foreign Application Priority Data

Nov. 8, 1986 [GB] United Kingdom ............ 8626734

[51] Int. Cl.$^5$ ........................................ G05B 19/41
[52] U.S. Cl. .......................... 364/167.01; 364/474.29; 364/474.30
[58] Field of Search ............... 364/474.37, 474.30, 364/174, 167.01, 175, 474.03, 474.12, 474.2, 474.29, 474.32; 218/578, 561, 571

[56] References Cited

U.S. PATENT DOCUMENTS

| | | | |
|---|---|---|---|
| 3,035,216 | 5/1962 | Rhoades et al. | 318/162 |
| 3,793,511 | 2/1974 | Bala et al. | 364/474.28 |
| 3,893,616 | 7/1975 | Trousdale | 364/174 |
| 4,062,648 | 12/1977 | Hennessee | 364/105 |
| 4,262,336 | 4/1981 | Pritchard | 364/474.3 |
| 4,424,570 | 1/1984 | Imazeki et al. | 364/474.28 |
| 4,503,493 | 3/1985 | Burkhardt et al. | 364/170 |
| 4,506,335 | 3/1985 | Magnuson | 318/571 |
| 4,543,625 | 9/1985 | Nozawa et al. | 364/474.29 |
| 4,639,172 | 1/1987 | Kishi | 364/474 |
| 4,648,024 | 3/1987 | Kato et al. | 364/474.31 |
| 4,688,179 | 8/1987 | Yamazaki | 364/474.29 |

FOREIGN PATENT DOCUMENTS

| | | |
|---|---|---|
| 0062159 | 10/1982 | European Pat. Off. |
| 58-101303 | 6/1983 | Japan . |
| 1391402 | 4/1975 | United Kingdom . |
| 1439373 | 6/1976 | United Kingdom . |
| 1506224 | 4/1978 | United Kingdom . |
| 1566030 | 4/1980 | United Kingdom . |

OTHER PUBLICATIONS

David C. Tribolet et al., "The HP 7550A X-Y Servo; State-of-...", Apr. 1985 Hewlett-Packard Journal; pp. 31-33.

Steven T. Van Voorhis, "Digital Control of Measurement ...", Hewlett Packard Journal; Jan. 1986, pp. 24-26.

Primary Examiner—Jerry Smith
Assistant Examiner—Jim Trammell
Attorney, Agent, or Firm—Oliff & Berridge

[57] ABSTRACT

A coordinate measuring machine has X and Y component drives for a probe. The two drives are driven to produce a resultant motion describing a curve having a given start velocity vector, a given end velocity vector, and following a given velocity function $V=f(K,t)$ wherein $K=a$ maximum acceleration term and $t=$time. A computer is programmed to determine the X and Y components (V1X,V1Y) of the start velocity vector and the X and Y components (V2X,V2Y) of the end velocity vector. Thereafter the program determines the difference (DVX) between the X component (V1X) of the start velocity vector and the X component of the end velocity vector, and computes values of the function $V=f(K,t)$ for that difference (DVX). Proportionate values are computed for the difference (DVY) of the respective Y components (V1Y,V2Y) of the start and end velocity vectors. The values are output to the respective X and Y component drives of the machine to drive the probe through the resulting curved path. Preferably the acceleration term has a triangular characteristic so as to define a constant rate of change of acceleration starting and ending with zero acceleration. This avoids impulsive motion of the probe. Other acceleration terms may be used. For example, the acceleration may vary sinusoidally or it may be constant.

20 Claims, 11 Drawing Sheets

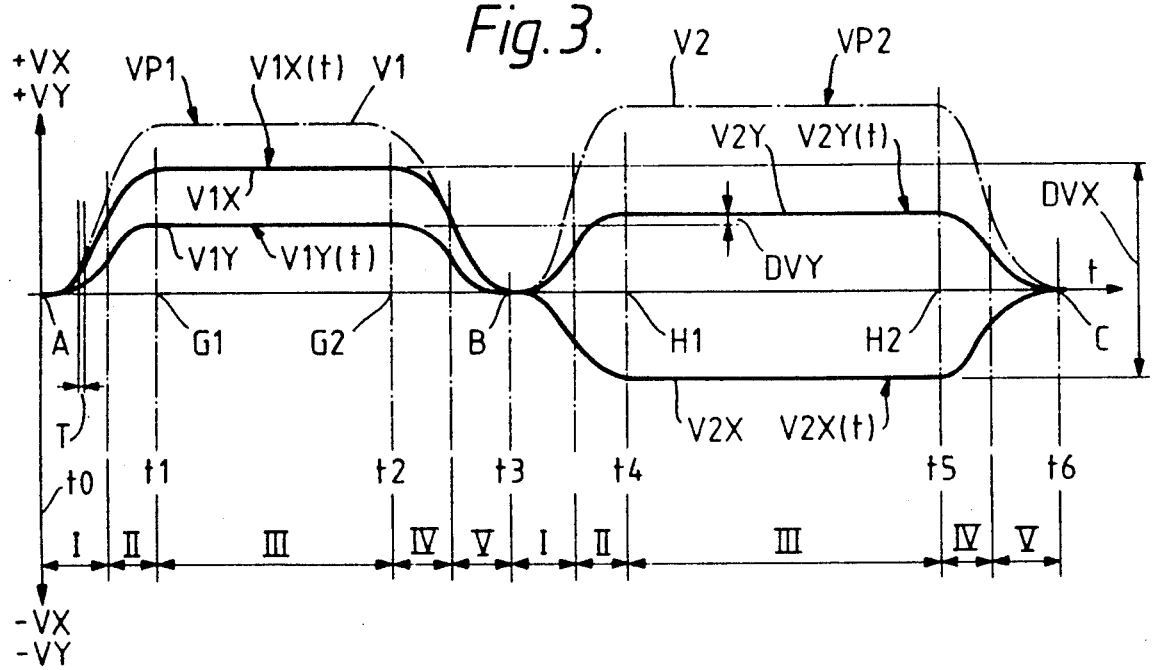
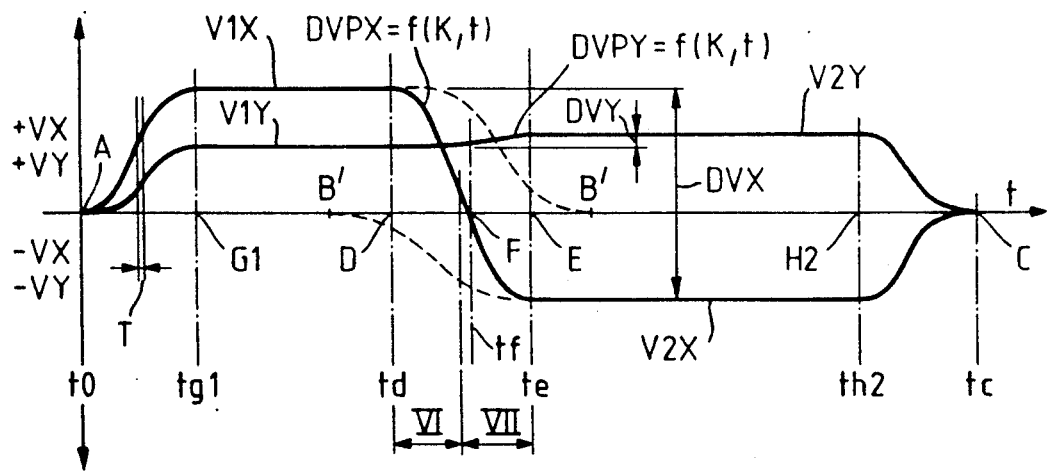
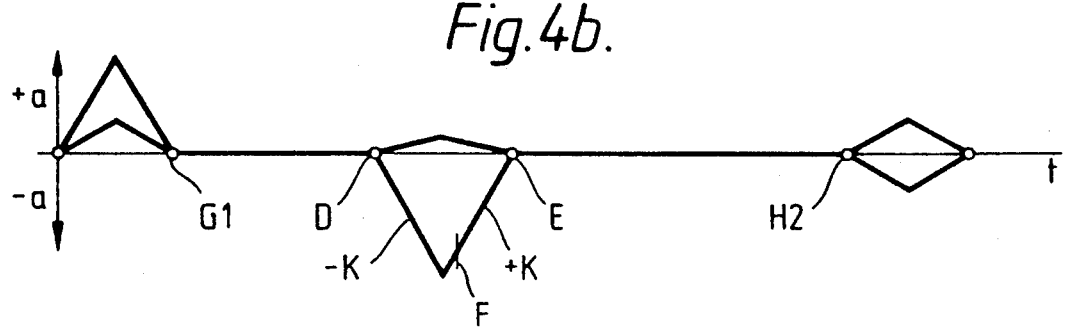

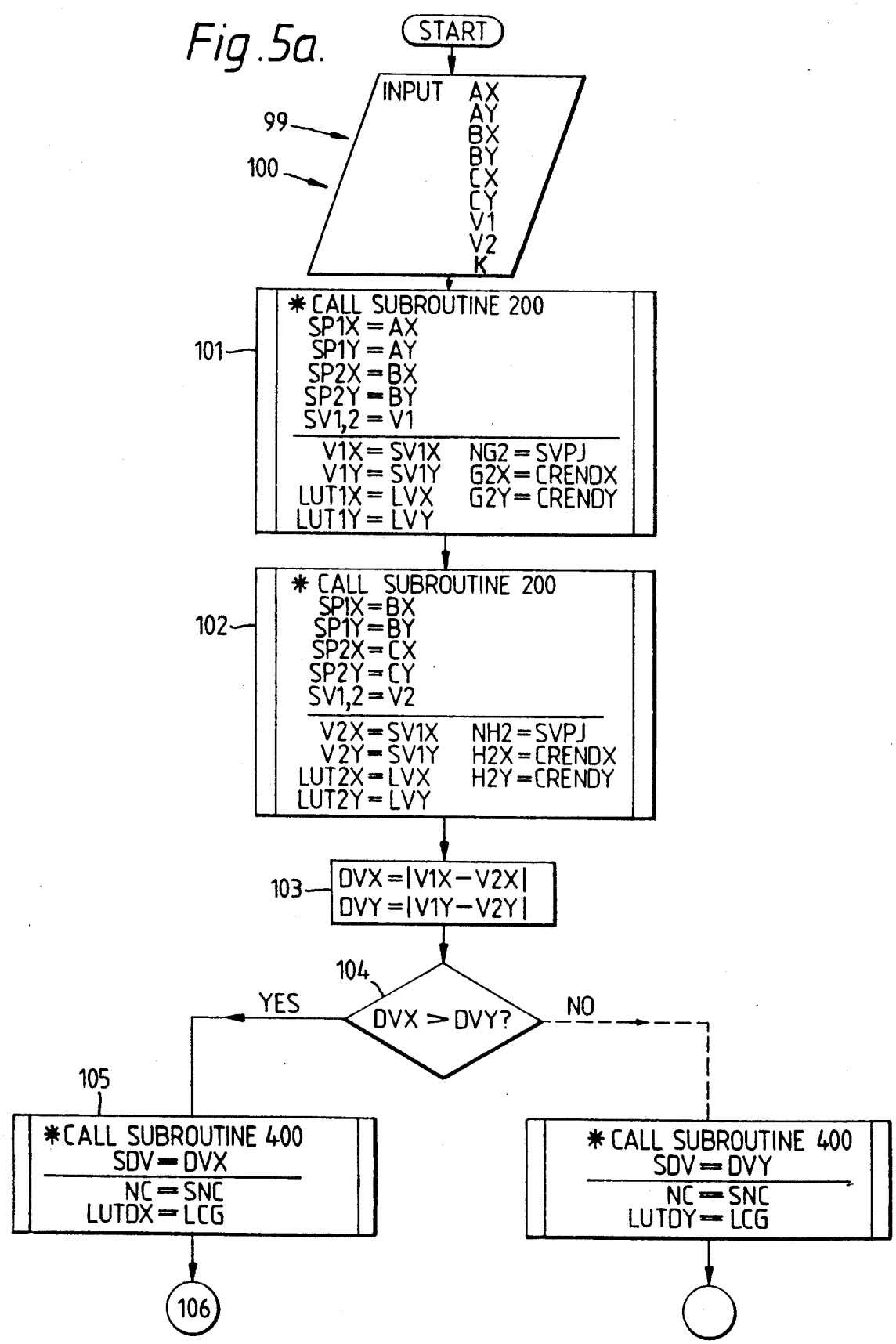

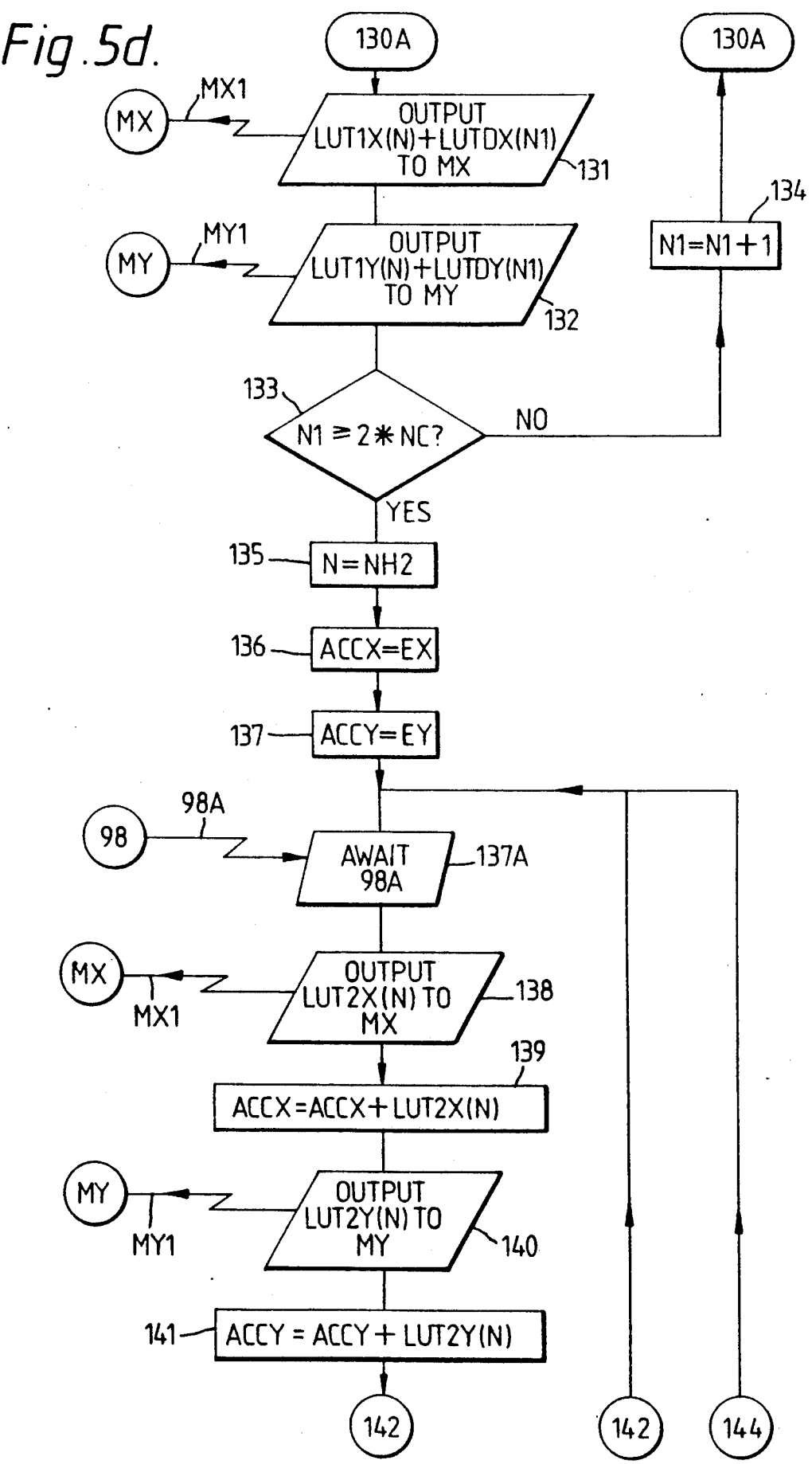

COORDINATE POSITIONING SYSTEM

FIELD OF INVENTION

This invention relates to a coordinate positioning system. More specifically, this invention relates to a method of and means for operating first and second coordinate positioning drives of a coordinate positioning apparatus to produce a resultant movement describing a curve.

The scope of this invention is specified in the claims hereto.

BRIEF DESCRIPTION OF THE DRAWINGS

An example of a system according to this invention will now be described with reference to the accompanying drawings wherein:

FIG. 3 is velocity/time diagram of the movement of said member along said path wherein said path is defined by two displacement vectors connecting three points;

FIG. 4a is a velocity/time diagram similar to FIG. 3 but wherein the displacement vectors are connected by a curve;

FIG. 4b is an acceleration/time diagram of FIG. 4a;

DESCRIPTION OF PREFERRED EMBODIMENT

Figure 1:
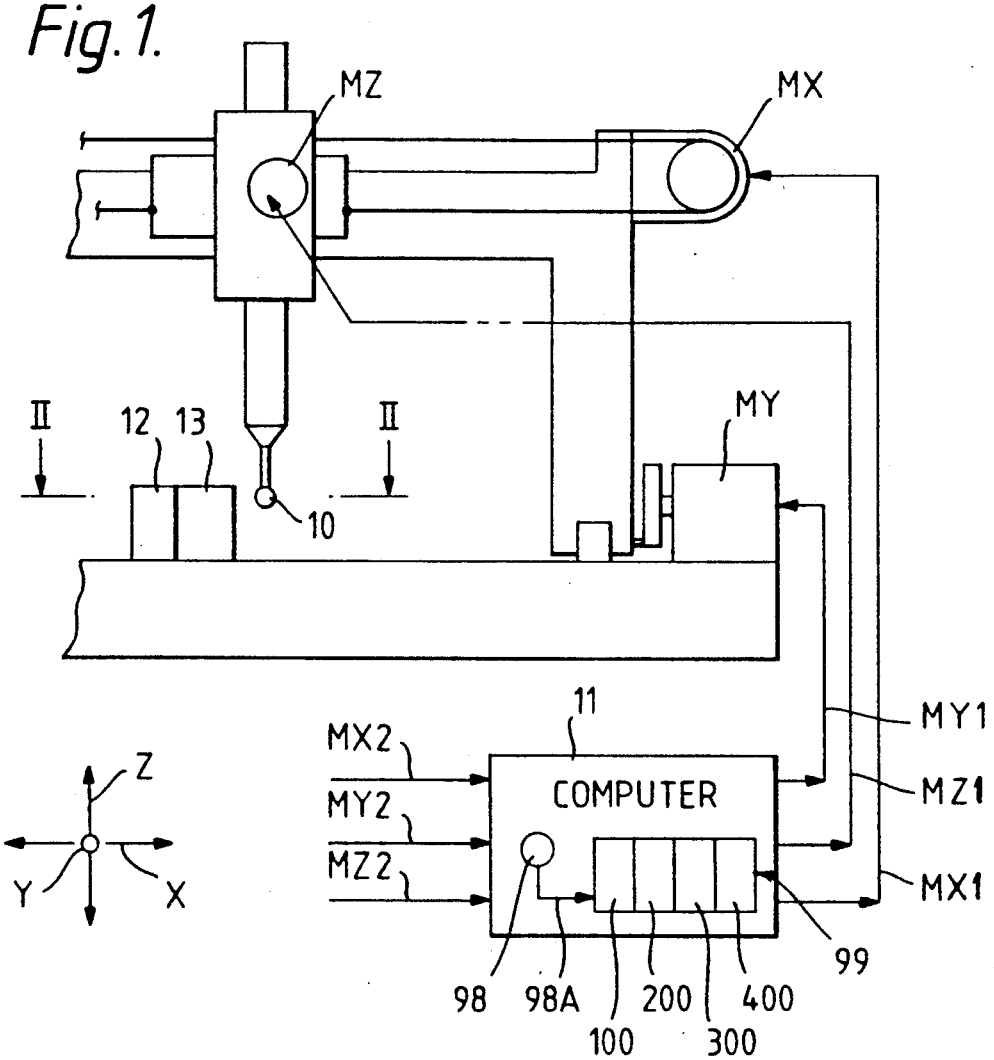
FIG. 1 is an elevation of a coordinate measuring machine.

The machine (FIG. 1) has a probe 10 supported for three-dimensional motion in directions X,Y and Z. Measurement of the co-ordinate position of a surface of a workpiece 12 is determined automatically when the probe is moved into engagement with that surface. The motion of the probe is effected by motors MX,MY,MZ controlled by position-determining signals MX1,MY1,MZ1 generated by a computer 11 on the basis of position feedback signals MX2,MY2,MZ2 output by position-reading devices (not shown). For present purposes only the drive to the motors MX,MY is considered.

Figure 2:
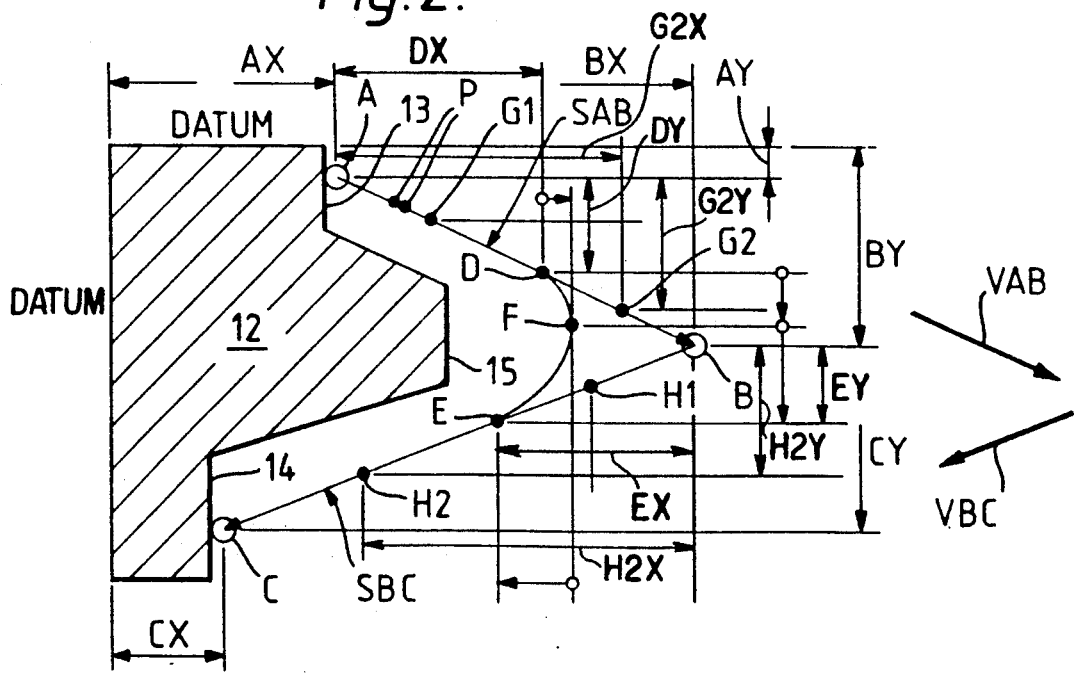
FIG. 2 is an enlarged view along line II—II in FIG. 1 showing additionally a diagram of a path to be described by a member of the machine.
Figure 5B:
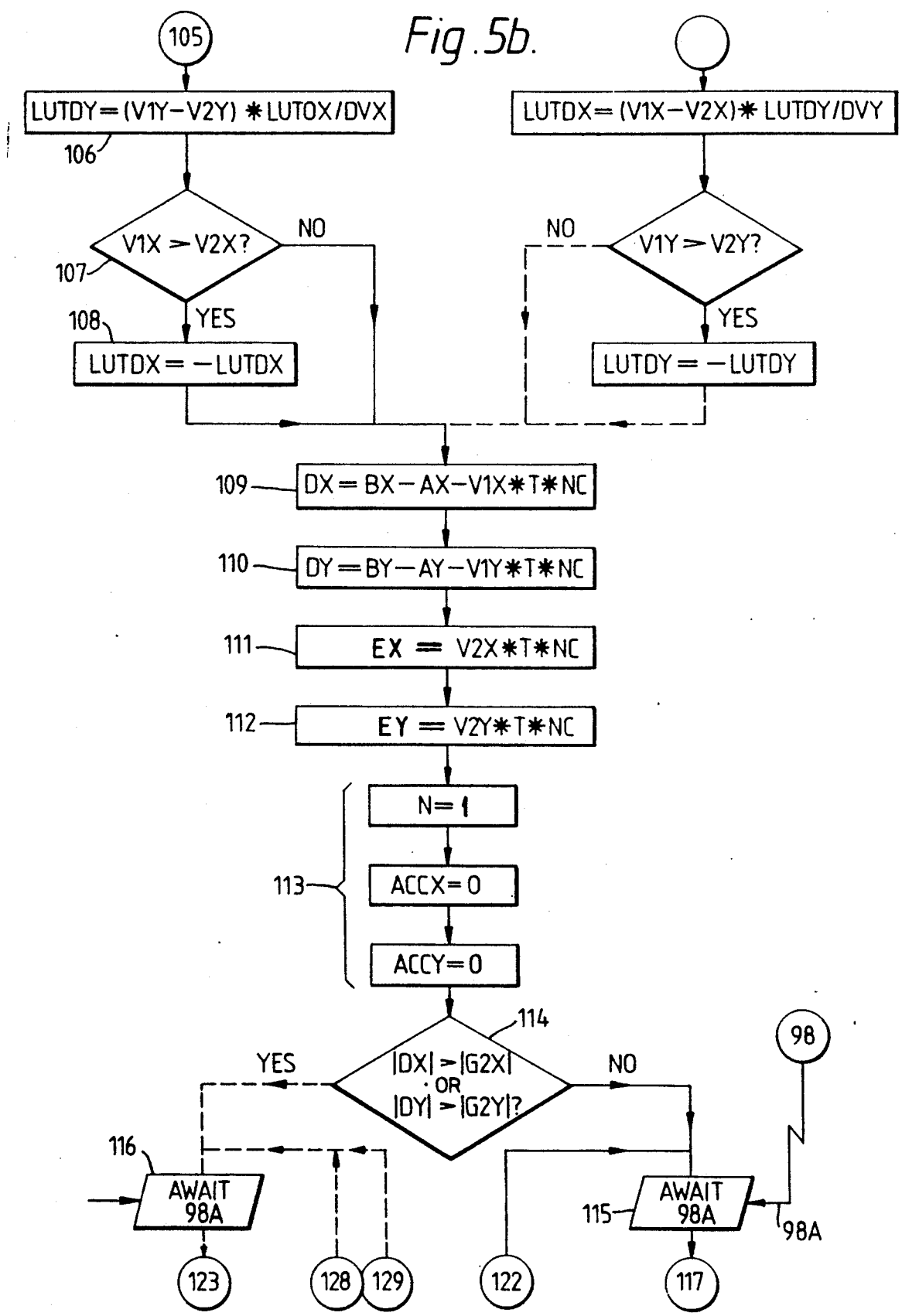
FIG. 5 (FIGS. 5a to 5e) is a flow diagram of a computer program and shows a main routine thereof.
Figure 5C:
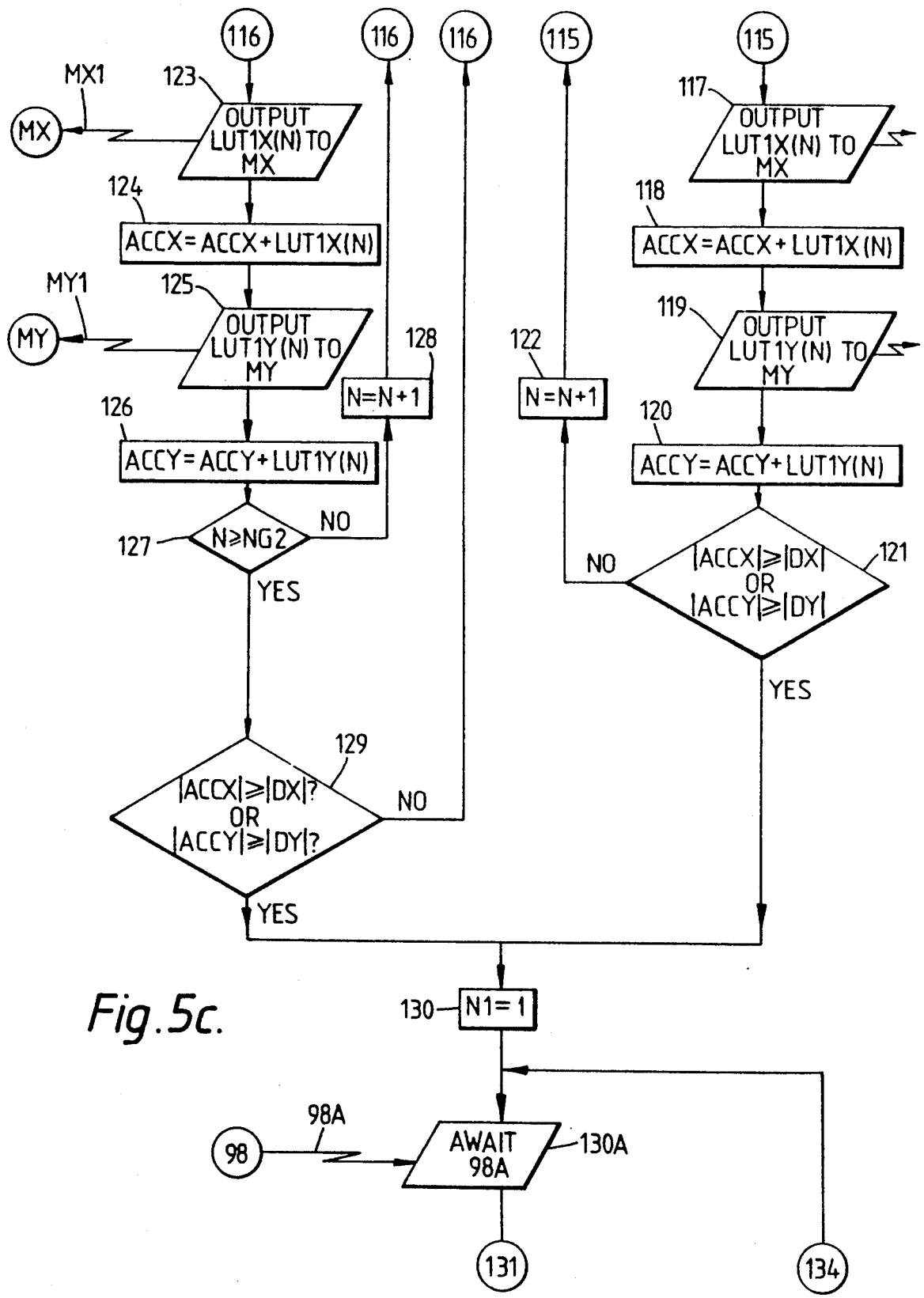
Figure 5E:
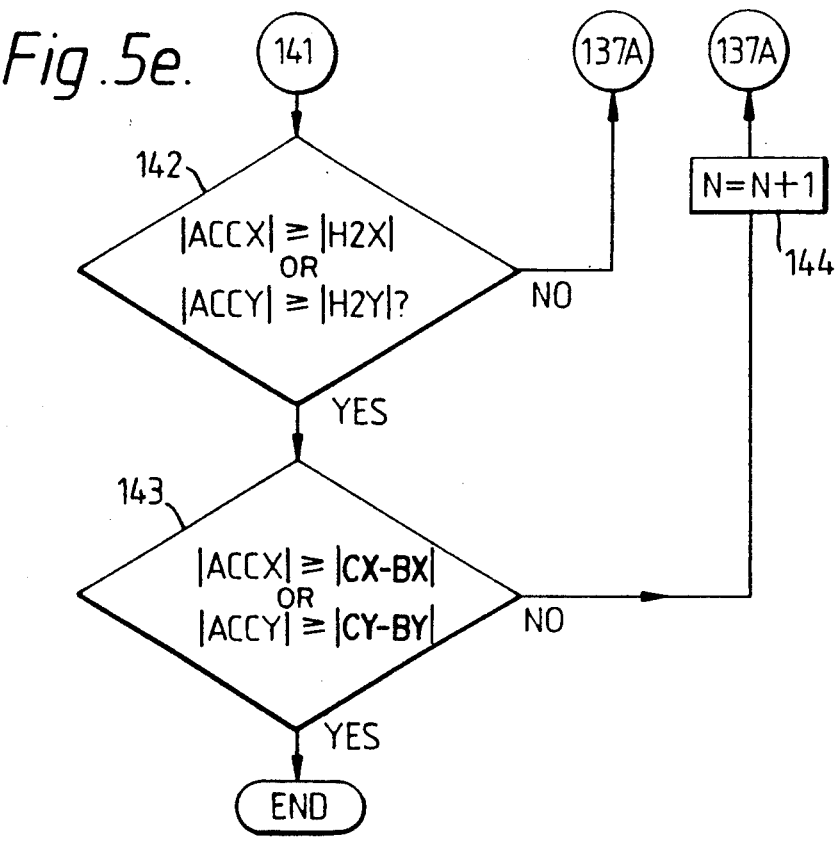
Figure 6A:
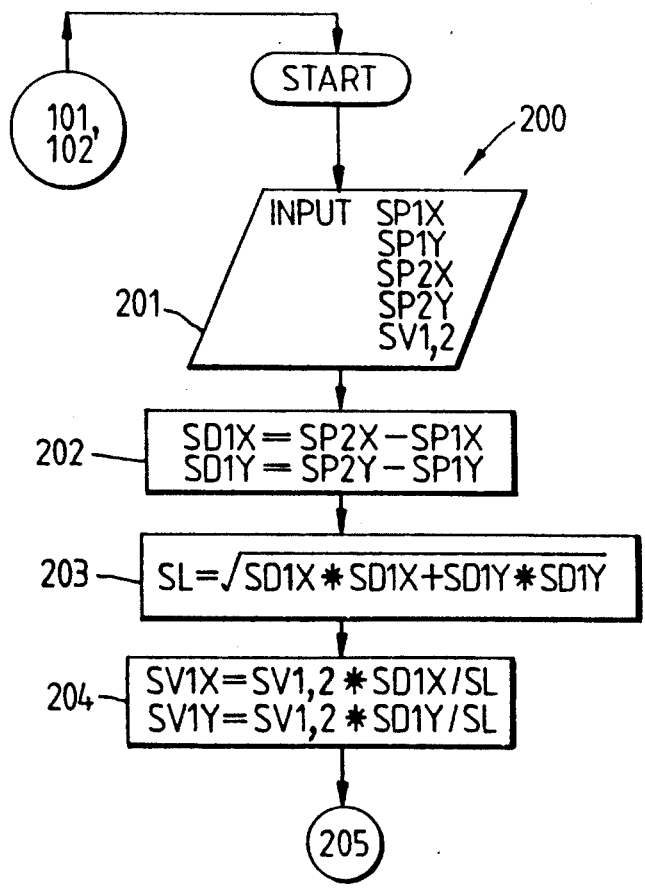
FIG. 6 (FIGS. 6a to 6b) is a flow diagram of a first sub-routine of the program.
Figure 6B:
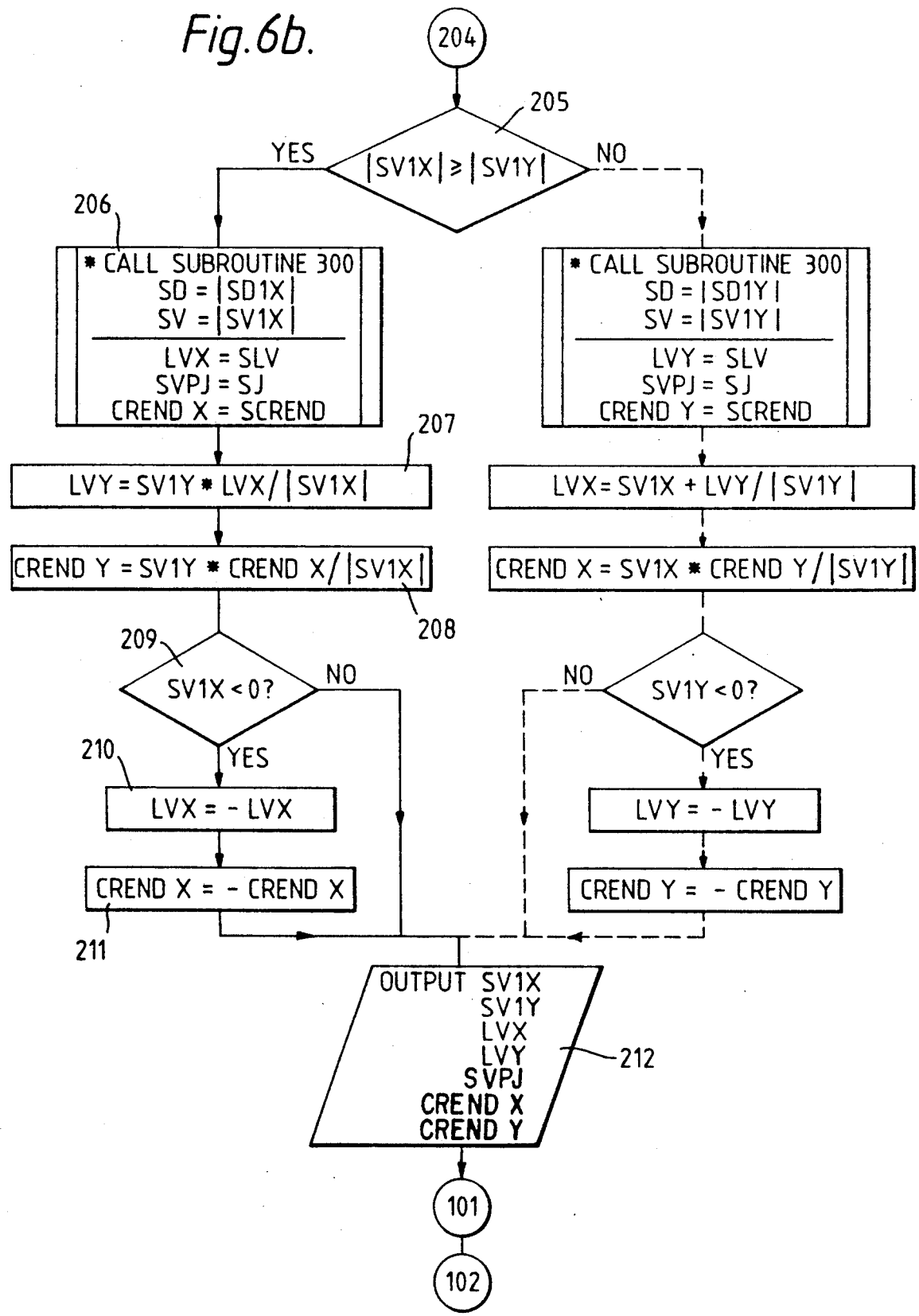

By way of example, the machine is required to measure the position of two surfaces 13,14 (FIG. 2) at opposite sides of a projection 15. Thus the probe, when moving from the surface 13 to the surface 14, has to circumnavigate the projection 15. To this purpose the computer has a program 99 (FIG. 1) to drive the probe along a path through points A,D,E,C wherein the path AD is part of a displacement vector SAB and the path EC is part of a displacement vector SBC. The vectors SAB, SBC are postulated to provide an initial orientation for the path, and a curve DE is introduced to shorten the path and to avoid the sharp change of direction which would occur if the movement were taken to the common point B of the two displacement vectors. Further, there is postulated for each path AB,BC a velocity vector VAB,VBC defined by a basic velocity profile VP1,VP2 (FIG. 3) comprising an initial acceleration period I,II, a period III of steady maximum velocity V1 or V2, and a final deceleration period IV,V. Such a basic profile is required to provide for the occasions when there is no need for a curve such as DE, e.g. if the probe 10 is required to reach the point B and stop there. However, inasmuch as there is need for the curve, the latter is arranged to connect the basic velocity profiles at the respective phases III of steady velocities thereof. Further, primarily for the reason that direction of the two paths AB,BC differ, there arises (as will be seen) a need for the curve itself to have a velocity profile and the program is written to provide for this.

The program is written to treat the displacement vectors SAB,SBC, the curve DE, and the velocity profiles VP1,VP2, entirely in terms of vector components in the co-ordinate directions.

Thus, bearing in mind that the example deals with the two-dimensional case, each displacement vector has components in the X and Y directions of its end points AX,AY,BX,BY, CX,CY (FIG. 2), and each velocity profile has X and Y velocity components V1X,V1Y,V2X,V2Y (FIG. 3). The motors MX,MY may be driven by velocity demand signals. However it has been found appropriate to generate these signals as position demand signals MX1,MY1 (FIG. 1) by writing the program to determine the co-ordinates of closely spaced points P (FIG. 2) along the path ADEC in terms of position increments per unit interval of time T (FIGS. 3,4), and the increments are output to the motors at those unit intervals. To this end, the computer 11 includes a clock 98 (FIG. 1) having a clock signal 98A occurring at the intervals T and connected (as described later hereinbelow) to control the output of the signals MX1, MY1. Therefore the speed of any one motor is determined by the magnitude of the position increments the motor has to satisfy in unit time. Although, as stated, the motors are driven by position demand signals in terms of demands for specified position increments, it is appropriate to illustrate the program in terms of velocity/time as has been done in FIGS. 3 and 4.

Figure 7A:
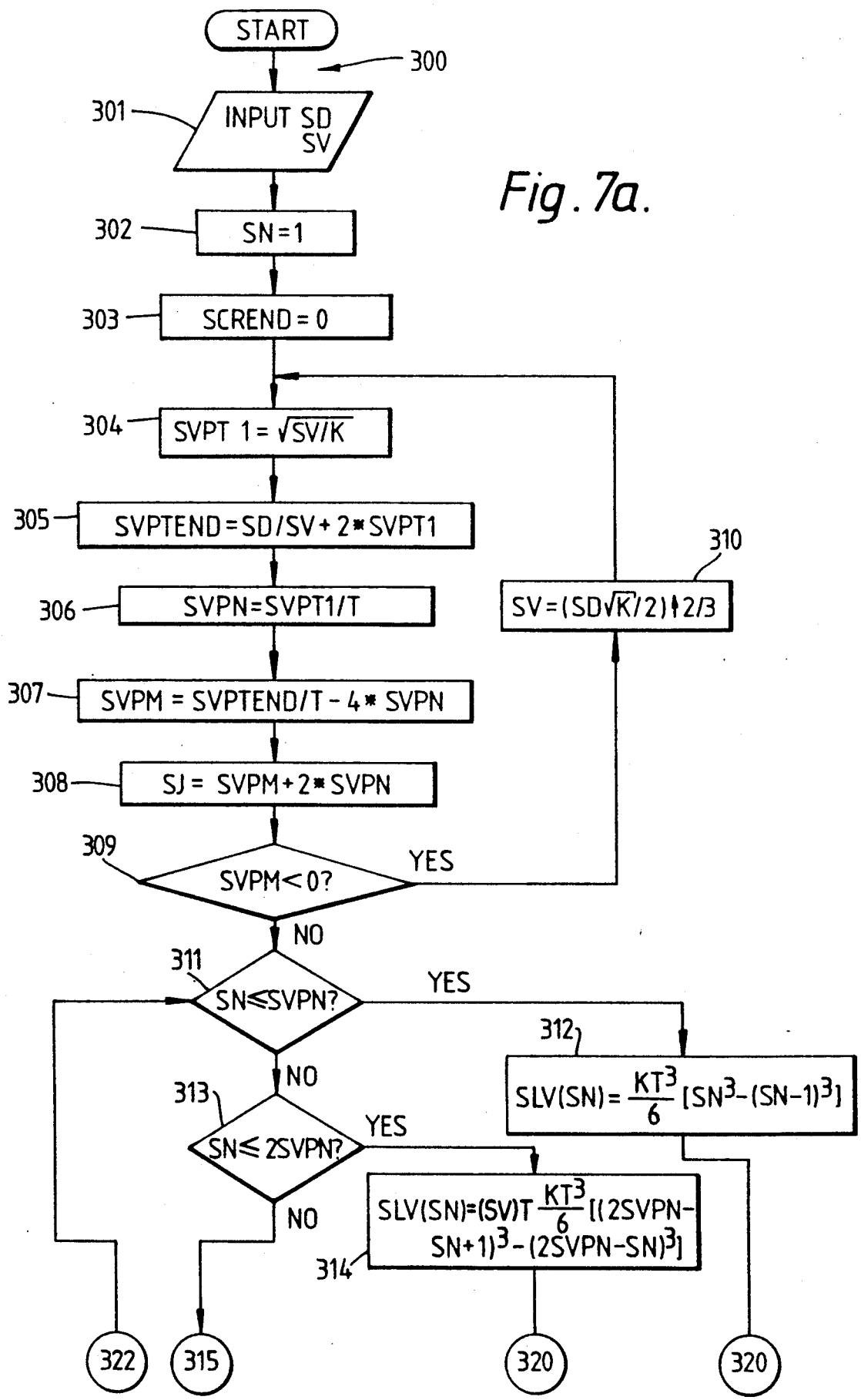
FIG. 7 (FIGS. 7a to 7b) is a flow diagram of a second sub-routine of the program.
Figure 7B:
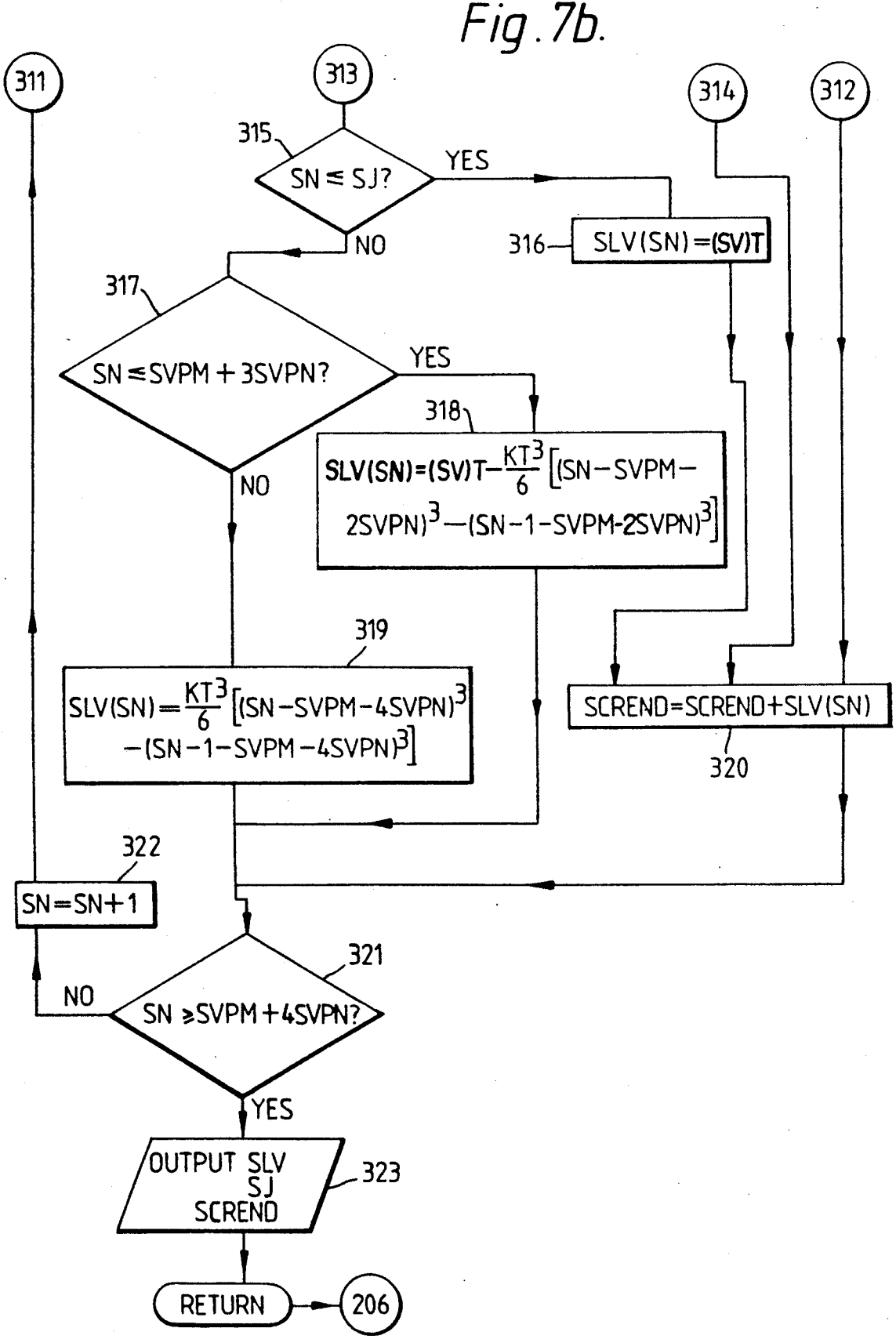
Figure 8:
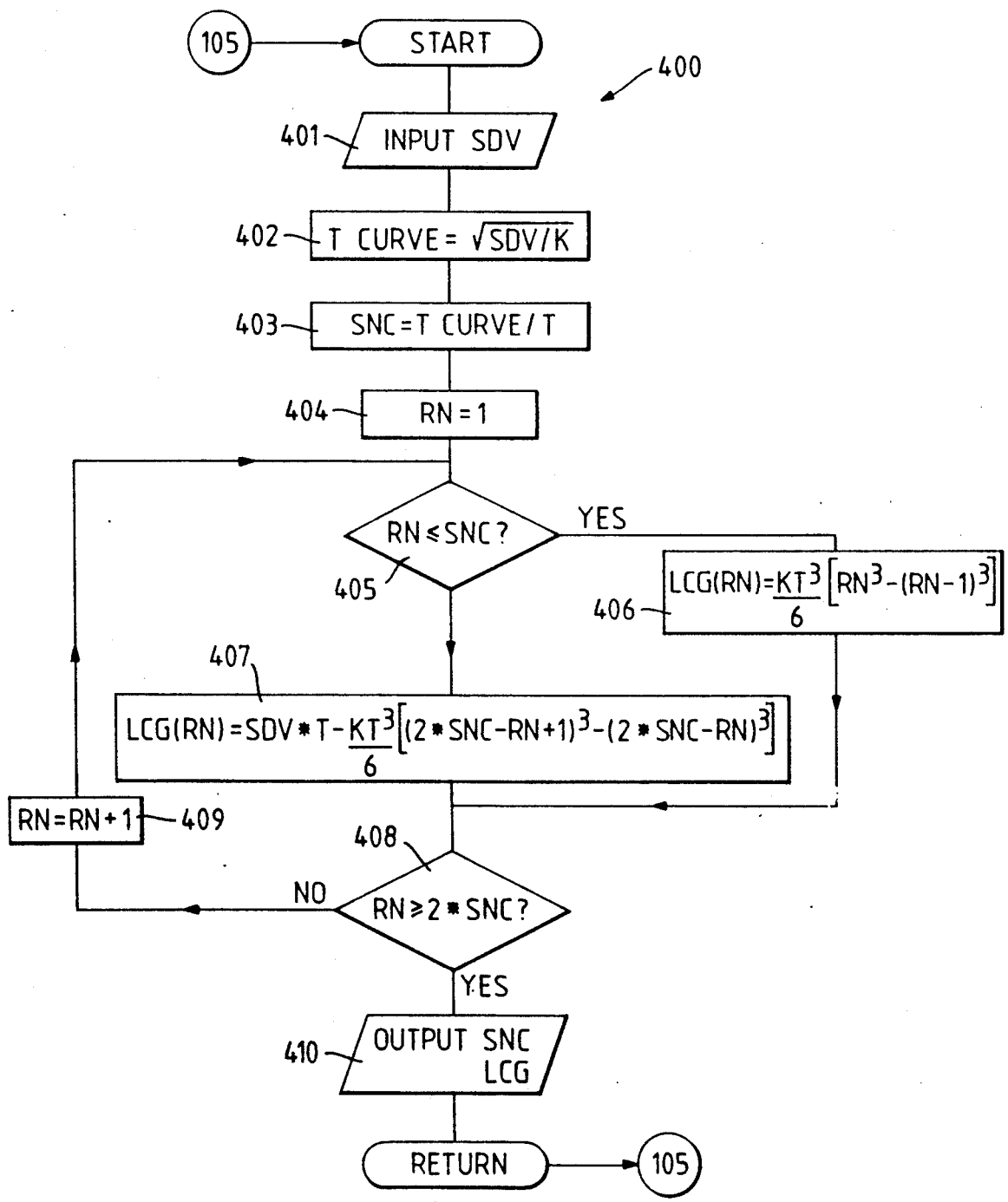
FIG. 8 is a flow diagram of a third sub-routine of the program.

Reviewing the program at first in general terms, the programmer introduces the parameters of the basic velocity profiles VP1,VP2 (FIG. 3), i.e. the values of the spatial co-ordinates of the points A,B,C, the values of the maximum steady velocities V1,V2, and the value of an acceleration term K (FIGS. 4b and 7) defining a maximum rate of change of acceleration. The program determines the component profiles V1X(t),V1Y(t),V2X(t),V2Y(t) of the basic profiles, each component profile having a period of acceleration and deceleration and a period of steady velocity component V1X,V1Y,V2X,V2Y. It is only necessary to compute one of the X or Y component profiles, because the other component profile can be generated by scaling, i.e. by generating proportionate values, which saves computing time. To this end the program determines, in each basic profile, which of the components is the greater. It will be clear from FIG. 2 that the X component of displacement (BX−AX) is greater than the Y component of displacement (BY−AY), so that the component velocity V1X must be greater than the component velocity V1Y if the X and Y movements are to meet simultaneously at the point B. It is preferred to carry out the computation in respect of the larger component and to scale the lesser one because if the latter is very small it would not be possible to produce an accurate scaling of the larger component.

Next, the program generates the curve DE, that is it determines the coordinate positions of points P between the start and end points D,E of the curve. Here, use is made of the constant velocities V1X,V2X,V1Y,V2Y. It is sufficient to compute one of the profiles for the curve on the basis of one pair of constant velocities V1X,V2X or V1Y,V2Y and then scale the other profile of the curve accordingly. Clearly, it is desirable that the computation is done for that profile of the curve which connects the pair of constant velocities V1X,V2X or V1Y,V2Y which have the greater difference DVX or DVY (FIG. 3) between the highest and lowest values. To this end the program determines the difference DVX between the velocities V1X,V2X and the difference DVY between the velocities V1Y,V2Y of the two basic profiles VP1,VP2, and determines which of the differences DVX or DVY is the greater. The appropriate component profile DVPX or DVPY of the curve is then computed on the basis of the component velocities having the greater said difference. The rate of change of acceleration (FIG. 4b) necessary for this purpose is preferably the same as that used for the initial acceleration period I,II of the relevant profile. It will be understood that the curve DE is determinable independently of the basic profiles so long as the start and end velocities and the rate of change of acceleration are given. When determining the curve, the coordinates of the points D,E arise in the same way as any other point P, and this determines when the steady velocity V1 has to end, and when the steady velocity V2 has to begin.

FIG. 4a shows how the component profiles V1X(t),V1Y(t), V2X(t),V2Y(t) are discontinued between the points D,E and are replaced by component profiles DVPX and DVPY of the curve DE. Following determination of the start and end points of the curve, and consequent determination of the end and start points for the steady velocities, the curve fits automatically between the latter velocities as shown at periods VI,VII. It will be seen that the profile DVPX starts and ends with zero deceleration at time points td and te respectively. Medially between the points td,te, at the junction of the periods VI,VII, the deceleration is a maximum. The profile DVPY has a corresponding acceleration characteristic, hence the change of momentum of any mass moved in accordance with the combines profiles DVPX,DVPY starts and ends with a minimum change and has a maximum change medially therebetween. This arises from the use of a said constant rate of change of acceleration or deceleration. As a result each component movement has a motion which is free from impulse with consequential benefit for the resultant movement.

The profiles DVPX,DVPY are derived from a resultant velocity function V=f(K,t) wherein K=a maximum acceleration term and t=time. Each profile DVPX,DVPY may be said to be a corresponding function f(K,t) of a velocity difference DVX or DVY (FIG. 4a), wherein the two functions have the same start point td and the same end point te in time, wherein both functions follow the same law, wherein the values of the two functions have proportions determined by the respective start and end velocities V1X,V2X or V1Y,V2Y, and wherein each function is symmetrical about the mid-point between the start and end times td,te. In the example, the acceleration term has a triangular characteristic so as to define said constant rate of change of acceleration K, starting and ending with zero acceleration, thereby having the benefits mentioned. The functions may have other acceleration terms as described later herein.

As mentioned, the basic velocity profiles VP1,VP2 are determined on the basis of a given maximum velocity and of a given rate of change of acceleration. It follows that the greater the steady velocity V1,V2 the greater are the periods I,II of initial acceleration, the periods VI,VII of deceleration/acceleration of the curve DE, and the period IV,V of final deceleration, and the shorter are the periods III of steady velocity. In order to fit the curve successfully between the initial acceleration at period I,II and final deceleration IV,V, two conditions have to be met. Firstly, the period VI,VII of the curve DE must not be less than can be accommodated between the end of the steady velocity period III of the first vector VAB and the beginning of the steady velocity period III of the second vector VBC. If that should be the situation, the remedy is to extend the steady period III of the first profile VP1 beyond that originally produced. Correspondingly the steady velocity period III of the second profile VP2 may have to be started earlier. Secondly, the period VI,VII of the curve DE must not be greater than can be accommodated between the start of the steady velocity period III of the first profile VP1 and the end of the steady velocity period III of the second profile VP2. If the latter condition is not satisfied, the remedy is to lower the steady velocity from its maximum value with the consequence of reducing the periods I,II of initial acceleration, the period of the curve VI,VII and the period IV,V of final deceleration. The remedies described are determined by the programmer by appropriate selection of the maximum steady velocities V1,V2 and the maximum rate of change of acceleration for any given pair of displacement vectors SAB,SBC.

Referring now to the program 99 in detail (FIGS. 5 to 8), there are the following routines and identifiers.

IDENTIFIERS OF MAIN ROUTINE 100

AX = X co-ordinate positions of A
AY = Y co-ordinate positions of A
BX = X co-ordinate positions of B
BY = Y co-ordinate positions of B
CX = X co-ordinate positions of C
CY = Y co-ordinate positions of C
V1 = steady part of VP1
V2 = steady part of VP2
V1X = steady part of V1X(t)
V1Y = steady part of V1Y(t)
LUT1X = look-up table of position increments of X component of the velocity profile VP1.
LUT1Y = look-up table of position increments of Y component of the velocity profile VP1
NG2 = number of sampling periods needed to move between points A,G2
G2X = X co-ordinate of the point G2.
G2Y = Y co-ordinate of the point G2.
V2X = steady part of V2X(t)
V2Y = steady part of V2Y(t)
LUT2X = look-up table of position increments of X component of a velocity profile VP2.
LUT2Y = look-up table of position increments of Y component of a velocity profile VP2
NH2 = number of sampling periods needed to move between points B,H2
H2X = X co-ordinate of point H2

H2Y = Y co-ordinate of point H2
DVX = difference between V1X,V2X
DVY = difference between V1Y,V2Y
NC = No. of sampling periods in a given time period
LUTDX = look-up table of position increments of velocity difference profile DVPX
LUTDY = look-up table of position increments of velocity difference profile DVPY
DX = X-position of D
DY = Y-position of D
EX = X-position of E
EY = Y-position of E
N = first index for look-up tables.
ACCX = accumulated increments of table LUT1X or LUT2X.
ACCY = accumulated increments of table LUT1Y or LUT2Y.
N1 = second index for look-up tables
K = maximum rate of change of acceleration

IDENTIFIERS OF SUB-ROUTINE 200

SP1X = X-co-ordinate of start point for a velocity profile e.g. V1X(t).
SP1Y = Y-co-ordinate of start point for a velocity profile e.g. V1Y(t)
SP2X = X-co-ordinate of end point for a velocity profile e.g. V1X(t).
SP2Y = Y-co-ordinate of end point for a velocity profile e.g. V1Y(t).
SV1,2 = desired max. velocity of a velocity profile e.g. V1.
SD1X = difference between SP2X and SP1X = X component length of a displacement vector e.g. SAB.
SD1Y = difference between SP2Y and SP1Y = Y component length of a displacement vector e.g. SAB.
SL = length of a vector e.g. SAB.
SV1X = X-component of SV1,2.
SV1Y = Y-component of SV1,2.
LVX = look-up table of position increments of X-component of a velocity profile e.g. V1X(t)
SVPJ = number of sampling periods needed to move between two points e.g. A,G2.
CRENDX = X-co-ordinate of a point e.g. G2.
LVY = look-up table of position increments of Y-component of a velocity profile e.g. V1Y(t).
CRENDY = Y-co-ordinate of a point e.g. G2.

IDENTIFIERS OF SUB-ROUTINE 300

SD = component length of a vector e.g. BX − AX,
SV = component speed for movement along SD.
SN = index for a look-up table.
SCREND = co-ordinate of a point e.g. G2X.
K = maximum rate of change of acceleration
SVPT1 = a half period of an acceleration/deceleration curve e.g. the half-period I.
SVPTEND = time needed for movement along the component length SD.
SVPN = number of sampling periods T in the half-period SVPT1.
SVPM = number of sampling periods T in the constant speed run of a velocity profile component e.g. V1X(t).
SJ = The number of sampling periods T in the time needed for movement between the beginning and the end (e.g. the points AX and G2X) of a velocity profile component (e.g. V1X(t)).
SLV = look-up table of position increments for a velocity profile component (e.g. V1X(t)).

IDENTIFIERS OF SUB-ROUTINE 400

SDV = a velocity difference (e.g. DVX).
TCURVE = a half-period (e.g. VI) of a velocity difference profile (e.g. DVPX).
SNC = number of sampling periods T in the half-period Tcurve.
RN = an index for a look-up table.
LCG = a look-up table.

MAIN ROUTINE 100 (FIG. 5)

The successive steps of the program 100 are now recited with comment where appropriate.

101—Loading of data into subroutine 200 for determination of the increments in co-ordinate position corresponding to the velocity profile VP1 and the co-ordinate velocities V1X,V1Y of the steady part of VP1. See steps 116-143 below.

102—Loading of data into subroutine 200 for determination of the increments in co-ordinate position corresponding to the velocity profile VP2 and the co-ordinate velocities V2X,V2Y of the steady part of VP2.

103—Establishing the difference DVX (FIG. 3) between the co-ordinate velocities V1X,V2X and the difference DVY between the co-ordinate velocities V1Y,V2Y.

104—Establishing which of the differences DVX or DVY is the greater. It will be appreciated that when moving between the points DE there would normally be a need for a velocity change between the X components of the steady velocities of the two vectors and another such change between the Y components. The velocity profile to be established for the curve DE is determined by the greater of those two changes. It is assumed in this example that the difference V1X−V2X is greater than V1Y−V2Y so that the program proceeds along the "yes" arm of the decision 104.

105—Loading of the value DVX into subroutine 400 for determination of the position increments defined in look-up tables LUTDX of the X coordinate DVPX of the velocity difference profile DVP. The profile DVPX is an absolute value not taking account of the sign of DVPX. The time period NC is determined in subroutine 400 and subsequently becomes available at this time. In the present example the profile DVPX falls with time so that its sign is negative and this will be determined at steps 107, 108 below. Further in the present example the change between the velocities V1X,V2X is not so much a matter of magnitude but a matter of direction, i.e. V1X is positive while V2X is negative. This reversal of sense of direction means that the movement has to stop and reverse at a point F (FIGS. 2,4) and the computations shown take account of this.

106—Establishing the value of position increments defined in look-up table LUTDY of the Y coordinate of the difference profile DVP as a proportions of LUTDX in the ratio of (V1Y−V2Y):DVX. All elements of LUTDY are scaled.

107—Decision to establish whether the difference V1X−V2X is less than zero.

108—The "yes" arm of 107 determines the LUTDX is negative in accordance with FIG. 4.

109—Determining the X coordinate DX of the point D as a function of (BX−AX) and of a distance being a function of V1X and half of the number of sampling periods pertaining to the total curve time (NC).

110—Same as 109 but for Y coordinate of point D.

111, 112—Same as 109, 110 but for X, Y coordinates of point E.

113—Initializing the number N of the look-up tables LUT1X, LUT1Y. This number being held in an appropriate counter (not shown). Initializing the sum ACCX. Initializing the sum ACCY.

114—Decision as to whether the point D occurs after point G2. If so, the constant speed is continued beyond the point G2 until a position defined by the coordinates of the point D is reached. In the present example the answer is "no". If "yes" go to 123.

115—Await the signal 98A from the clock 98. As mentioned with reference to FIGS. 3, 4, the signal 98A establishes the time intervals T at which the signals MX1, MY1 are output.

116—The same as 115, but coming into operation if point D occurs after point G2.

117—Output position increments for the motor MX to drive the machine in the X component of the path AD. The information is generated as positions required at time intervals given by the clock 98 of the computer 11 and held in the table LUT1X.

118—Establishing the sum ACCX which is a measure of the distance travelled in the X coordinate.

119—Same as 117 but in respect of the Y component of the path AD.

120—Same as 118 but in respect of the sum ACCY.

121—Decision to establish whether the point D has been reached. If "no" go to step 122. If "yes" go to step 130. At this time, as in step 129, the number N is that pertaining to the point D and the corresponding increments in the look-up tables LUT1X, LUT1Y pertaining to the constant run values V1X, V1Y.

122—Updating of the serial number N of the look-up tables.

123, 124, 125, 126—The same as 117, 118, 119, 120, but coming into operation if point D occurs after point G2.

127—Decision as to whether the serial number N has reached the number NG2 defining the position of the point G2. If "no" the action goes to steo 128. If "yes" go to step 129. At this time, the number N is that pertaining to the point G2 and the corresponding increments in the look-up tables LUT1X, LUT1Y pertain to the constant run values V1X, V1Y.

128—The same as step 122.

129—Decision to establish whether the point D has been reached. If "no" the action goes back to step 116 with the result of the last number N remaining effective, i.e., the speed remaining at the constant run values V1X, V1Y, until the point D is reached.

130—Initializing the number N1 of the look-up tables LUTDX, LUTDY.

130A—Same as 115.

131—Output position increments for the motor MX to drive the machine in the X component of the curve DE. Note that the increment is the sum of the last increment LUT1X(N) leading to the point D and an increment LUTDX(N1) defining the change in speed initializing the X component of the curve DE.

132—Same as 131 but pertaining to the Y component of the curve DE.

133—Decision as to whether the number N1 is such that point E has been reached. If "no" go to 134. If "yes" go to 135.

134—Update the number N1 for the next cycle through steps 131, 132.

135—Initializing the number N of the look-up tables LUT2X, LUT2Y to a number NH2 pertaining to the last position increments of the constant run speeds V2X, V2Y, this being at the point H2.

136—Initializing the sum ACCX to the value corresponding to the point E.

137—Initializing the sum ACCY to the value corresponding to the point E.

137A—Same as 115.

138—Output position increments for the motor MX to drive the machine to the point C.

139—Establish the sum ACCX which is a measure of the travel in the X coordinate.

140—Same as 138 but for the Y coordinate.

141—Same as 139 but for the Y coordinate.

142—Decision as to whether the sums ACCX, ACCY are such that the point H2 has been reached. If "no" go to step 137A. If "yes" go to step 143.

143—Decision as to whether the sums ACCX, ACCY are such that the point C has been reached. If "no" go to step 144. If "yes" go to end.

144—Update the number N and go to step 137A.

SUBROUTINE 200 (FIG. 6)

Subroutine 200 comprises the following steps:

201—Reading data from main program steps 101, 102.

202—Calculating the X and Y components of displacement SD1X, SD1Y between points SP1, SP2.

203—Calculating the length SL of the vector joining the points SP1, SP2.

204—Calculating X and Y component velocities SV1X, SV1Y.

205—Decision as to which of the co-ordinate velocities SV1X, SV1Y is the greater in magnitude. Assuming the velocity SV1X to be the greater (as is the case with the velocity V1X between the points G1, G2 in FIG. 3), the decision leads to the "yes" branch.

206—Load absolute values of SD1X, SV1X into subroutine 300 for calculating position increments LVX.

207—Scaling of the profile LVY for the Y component, i.e. in this case the smaller component.

208—Scaling the value CRENDX by the same factor as at step 207 to produce the value CRENDY.

209—Decision as to whether SV1X is positive or negative. Assuming SV1X is negative (as in the case of V2X in FIG. 3), the decision leads to the "yes" branch.

210—Multiply LVX by (−1).

211—Multiply CRENDX by (−1).

212—Output data to main program steps 101, 102.

It will be seen that the subroutine 200 establishes data defining (a) the X, Y components SD1X, SD1Y of the displacement vectors SAB, SBC, (b) the X, Y components V1X, V1Y, V2X, V2Y of the velocities V1, V2, (c) of each vector, which of the X, Y velocity components is the greater. Establishing these data is a necessary preliminary for establishing by subroutine 300, the actual velocity profiles of said greater components and the subsequent scaling of the other, lesser components.

SUBROUTINE 300 (FIG. 7)

More specifically, subroutine 300, brought in at step 206 of subroutine 200, is concerned with determining increments in co-ordinate position corresponding to a velocity profile SV(t), in the present example the respective profiles V1X(t) and V2X(t). The subroutine 300 has the following steps:

301—Receiving from subroutine 200 data SD defining the vector component SD1X or SD1Y pertaining to the greater velocity component SV1X or SV1Y, the velocity component being received as data SV.

302—Initializing a counter.

303—Initialize the variable SCREND.

304—Calculating the half-time SVPT1 being half the time period necessary to attain the maximum component velocity SV at a given rate of change of acceleration K. Note that, as shown in FIG. 3, there are in respect of each vector four such half-time periods SVPT1 denoted I, II, IV, V.

305—Calculating the total time SVPTEND required to traverse the distance SD wherein SVPTEND comprises the four half periods SVPT1 (arranged to give acceleration and deceleration as shown in FIG. 3) and a further period III during which the movement takes place at constant speed SV. The latter period can of course be zero.

306—Calculating the number SVPN of sampling period of time period T included in SVPT1.

307—Calculating the number SVPM of sampling periods of time period T included in period III.

308—Calculating the number SJ of sampling periods T included in periods I, II, III.

309—Decision whether the number SVPM is negative. If "no" go to step 311. If "yes", this indicates that velocity V1 or V2 (input at step 101 of program 100) cannot be reached within the specified distance SD; go to step 310.

310—Calculating a new value of SV such that the answer at step 309 becomes "no". This has the effect of reducing the time period III to zero, i.e. the velocity profile comprises only an acceleration and a declaration phase and the maximum speed attained is the best that can be achieved in the circumstances.

311—Decision whether SVPN has been reached. See remarks for 312.

312—Calculating the position increments SLV pertaining to the first half-period SVPT1, i.e. the period I of the profile V1X(t). The decision 311 monitors the progress of these increments and, when the profile has reached the last one of the number SVPN, the decision changes to step 313. The total number of values SLV produced in this way constitute a lock-up table SLV. The position increments produced at steps 314, 316, 318, 319 recited next below, are added sequentially to the table SLV.

313, 314—are respectively a decision and a calculation similar to those at steps 311, 312 but pertaining to the portion II of the profile.

315, 316 and 317, 318, 319 are the corresponding decisions and calculations for the periods III, IV, V of the velocity profiles V1X(t) or V2X(t).

320—Accumulating the position increments calculated at steps 312, 314, 316. This provides the increments for periods I, II, III. Note that increments for the periods IV, V are not required inasmuch as these periods are replaced later by period VI, VII (FIG. 4) for the velocity profile DVPX of the curve DE.

321—Decision whether the end of the velocity profile VP1 or VP2 has been reached. If "no" go to step 322. If "yes" go to step 323.

322—Increment the number SN by "1".

323—Output the data indentifying the variables SLV, SJ, SCREND to the main program 100.

SUBROUTINE 400 (FIG. 8)

Subroutine 400 is concerned with determining increments in co-ordinate position corresponding to a velocity difference profile, in this example the profile DVPX (FIG. 4). The subroutine 400 has the following steps:

401—Receiving from the main program 100 the data for a velocity difference SDV.

402—Calculating the half-time T curve, i.e. the half-value of the time within which the curved transition between the vectors SAB, SBC, is to take place, as a function of the velocity difference SDV.

403—Calculating the number SNC of sampling periods T included in the half-time T curve.

404—Initializing the value of the number RN.

405—Decision whether SNC has been reached. See remarks for 406.

406—Calculating the position increments pertaining to the first half of a velocity difference profile LCG, in the present example the profile DVP. The decision 405 monitors the progress of these increments and, when the profile has reached the last one of the number SNC, the decision 405 changes to the step 407.

407—Calculating the position increments pertaining to the second half of the velocity difference profile LCG. The first and second halves of this velocity profile have respectively phases of increasing and decreasing acceleration, the acceleration being zero at the start and the end with the movement. The calculation 406, 407 always start with the increasing acceleration phase. If, as in the case of the profile DVPX (FIG. 4) the curve is to start with the decreasing acceleration phase, the main program 100 acts at steps 107, 108 to multiply the output of steps 406, 407 by −1.

408—Decision whether the end of the velocity difference profile DVPX has been reached. If "no" go to step 409. If "yes" go to step 410.

409—Increase the number RN by "1".

410—Output the data identifying the variables SNC, LCG to the main routine 100.

The curvature of the curve DE generated by the above program is determined by the start and end velocity vectors and by the rate of change of acceleration used for determining the component velocity profiles of the curve. This curvature has zero value at the start and end points of the curve and a maximum value intermediate therebetween. In the special case of the speeds of the start and end velocity vectors being the same, the maximum curvature lies medially between the start and end points of the curve. The rate of change is chosen to be uniform for the curve. This provides freedom from impulsive velocity changes and results in relatively simple computation so that the cycle time of the program is relatively low. However, inasmuch as it may be desirable to modify the curvature, this may be done by modifying the rate of change of acceleration in the sense of making it non-uniform. For example the rate of change may be sinusoidal, i.e. the acceleration may have a sinusoidal characteristic SI (FIG. 4b) in which case the curvature of the curve DE is uniform, i.e. the curve DE is a circular arc.

As mentioned in connection with steps 131, 132 of the program 99, the drive signals MX1, MY1 are position signals output at the uniform time intervals T, the magnitudes of any one pair of position signals MX1, MY1 determining the velocity of the resulting movement. In a modification (not illustrated) the program is adapted to generate the signals MX1, MX2 as velocity signals, the feedback signals MX2, MY2 then being constituted velocity feedbacks.

The time interval T is of the order of 2 milliseconds and is chosen to be sufficiently short for machine control purposes and to be sufficiently long for one cycle of the program 99. The computer 11 is a modern microprocessor and the cycle time of the program 99 i.e. the time required to generate any one pair of signals MX1, MY1 and store this pair in a look-up table, is of the order of 100 microseconds. The output time for the signals MX1, MY1 to the motor is of the order of 40 microseconds. Thus the intervals T are much longer than the time necessary for generating and applying any one pair of signals MX1, MY1. It is therefore preferred to start the movement of the machine immediately following the generation of the first pair MX1, MY1. For simplicity, the program 99 is described along the lines of generating the whole of the necessary look-up tables before outputting the first pair of signals MX1, MY1. In practice the clock 98, which determines the intervals T, is used to interupt the program at each interval T to output any one "next" pair of signals MX1, MY1 from the look-up tables. In this way, the movement of the machine can be started directly following the generation of the first pair MX1, MY1, and the continued generation of the look-up tables can take place while the machine is in motion. In this way there is no loss of time due to having to await the completion of the look-up tables, and the operation of the machine takes place in real time.

In a modification, the law of the velocity functions DVPX, DVPY is characterised by a constant acceleration exemplified by a flat characteristic ST (FIG. 4b). This results in discontinuous changes in the acceleration diagram and corresponding changes in the forces acting in the machine. In other words, the curve is started by instantaneously applied component forces each of which acts uniformly for the whole of the curve and both of which cease simultaneously. This may be acceptable in certain cases especially if the mechanical system of the machine has good damping properties. As far as the calculation of the curve points are concerned, the algorithms are independent of the velocity function. It will be seen therefore that any acceleration characteristic can be chosen for the velocity functions to produce a desired curve.

We claim:

1. Coordinate positioning apparatus comprising a first and a second component drive means for imparting to a driven member a movement defined by a curve adapted to connect first and second linear paths, the member having first and second velocities along the first and second linear paths, respectively,
   (a) means for determining a pair of component velocities in respect to each of the first and second velocities:
   (b) means for establishing the difference between one corresponding pair of component velocities,
   (c) means for establishing the difference between another corresponding pair of component velocities,
   (d) means for establishing which of said differences is the greater and which is the lesser,
   (e) means for establishing a first velocity profile between corresponding component velocities having the greater said difference on the basis of the corresponding component velocities, and a constant absolute value for rate of change of acceleration,
   (f) means for establishing a second velocity profile between the corresponding component velocities having the lesser said difference, the second velocity profile being a scaled version of the first velocity profile,
   (g) means for generating drive signals defining said first and second velocity profiles, and
   (h) means for applying the said drive signals to said drive means thereby to produce a resultant movement.

2. Apparatus according to claim 1 wherein said first velocity profile is generated by a function generator including:
   (a) means for determining one half of a time period corresponding to said first velocity profile, means for determining a number of time intervals being fractions of said half time period,
   (b) means for determining an array, whose size is equal to said number, of discrete signals corresponding to velocity values which increase progressively at an increasing rate from the value of one of said velocity components,
   (c) means for determining an array, whose size is equal to said number, of signals corresponding to discrete velocity values which increase progressively at a decreasing rate between the value of one of the velocity components, and the value of the other of the components.

3. The method of operating a machine having two coordinate drives cooperating to produce a resultant movement of a driven member, comprising:
   (a) determining first and second velocities for movement of the driven member along respective paths having a point of intersection;
   (b) determining in respect of each velocity a pair of component velocities;
   (c) determining a first velocity profile between one component of the first velocity and the corresponding component of the second velocity and determining a corresponding second velocity profile being a scaled version of the first velocity profile;
   (d) a resultant velocity profile of the first and second velocity profiles defining a curve joining said paths, and having a start point and an end point;
   (e) the resultant velocity profile having at said start point a first pair of component velocities the same as those of the first velocity;
   (f) the resultant velocity profile having at said end point a second pair of component velocities the same as those of the second velocity;
   (g) defining a start point and an end point on the respective paths at which the curve is joinable thereto; and
   (h) actuating said coordinate drives sequentially in accordance with the component velocities of the first velocity, with the first and second velocity profiles of the curve, and with the component velocities of the second velocity.

4. The method according to claim 3, further comprising:
   determining said first velocity profile on the basis of the velocity difference, between corresponding components of the first and second velocities, which is greatest.

5. A method of operating a coordinate positioning machine to accelerate a head of the machine, the method comprising the steps of:

determining, on the basis of first and second velocities and a predetermined acceleration function, a time interval required to accelerate the head from the first to the second velocity;

determining on the basis of the time interval a curved velocity profile for accelerating the head from the first to the second velocity; and driving the head according to the curved velocity profile.

6. A method according to claim 5, wherein determining the curve velocity profile further comprises the step of:

generating, on the basis of the magnitude of the time interval, a series of position demand coordinates for driving the head.

7. A method according to claim 5, wherein the magnitude of the time interval is determined by equating the integral of the acceleration function between limits determined by the time interval to the difference in velocity between the first and second velocities.

8. A method of operating position drives of a coordinate positioning machine, to accelerate a head of the machine through a change in velocity from a first velocity to a second velocity, comprising the steps of:

determining on the basis of the first and second velocities, and of a constant absolute value for rate of change of acceleration, a time interval required to accelerate the head from the first to the second velocity;

determining on the basis of the time interval a velocity profile for accelerating the head from the first to the second velocity;

generating a drive signal representing the velocity profile; and applying the drive signal to the positioning drives of the coordinate positioning machine, thereby to accelerate the head from the first to the second velocity.

9. A method according to claim 8, wherein the first and second velocities are in different directions.

10. A method according to claim 8, wherein the first and second velocities are in the same direction.

11. A method according to claim 8, further comprising the steps of:

generating on the basis of the magnitude of the time interval, a series of position demand coordinates;

generating a periodic clock pulse having a constant period;

generating drive signals representing position demand coordinates; and applying the drive signals to the positioning drive at a frequency equal to the clock pulse.

12. A method according to claim 11, wherein the position demand coordinates are generated by a predetermined function of the incremental value of the clock pulses over a period of time equal to the time interval.

13. A method according to claim 8, wherein the time interval is equal to:

$$2(DV/K)^{\frac{1}{2}}$$

where:

DV is the change in velocity from the first velocity to the second velocity; and K is the constant absolute value of rate of change of acceleration.

14. A method of controlling positioning drives of a coordinate positioning machine, to drive a head of the machine from a first velocity to a second velocity, comprising the steps of:

determining on the basis of the first and second velocities and a constant absolute value for rate of change of acceleration, a series of position demand coordinates; and controlling the positioning drives so that they drive the head of the machine through the position demand coordinates.

15. The method according to claim 14 further comprising the step of determining on the basis of the first and second velocities and said constant value for the rate of change of acceleration, a time interval, and wherein said position demand coordinates are determined on the basis of said time interval.

16. The method according to claim 15, further comprising the steps of:

generating a periodic clock pulse having a constant period;

generating drive signals representing position demand coordinates; and applying the drive signals to the positioning drives at a frequency equal to the clock pulse.

17. The method according to claim 15, wherein the time interval is equal to:

$$2(DV/K)^{\frac{1}{2}}$$

where:

DV is the change in velocity from the first velocity to the second velocity; and K is the constant absolute value of rate of change of acceleration.

18. The method according to claim 15, wherein the position demand coordinates are generated by a predetermined function of the incremental value of the clock pulses over a period of time equal to the time interval.

19. Apparatus for operating positioning drives of a coordinate positioning machine, to accelerate a head of the machine through a change in velocity from a first velocity to a second velocity, comprising:

means for determining on the basis of the first and second velocities, and of a constant absolute value for rate of change of acceleration, a time interval required to accelerate the head from the first to the second velocity;

means for determining on the basis of the time interval a velocity profile for accelerating the head from the first to the second velocity;

means for generating a drive signal representing the velocity profile; and means for applying the drive signal to the positioning drives of the coordinate positioning machine, thereby to accelerate the head from the first to the second velocity.

20. Apparatus for controlling positioning drives of a coordinate positioning machine, to drive a head of the machine from a first velocity to a second velocity, comprising:

means for determining on the basis of the first and second velocities and a constant absolute value for rate of change of acceleration, a series of position demand coordinates; and means for controlling the positioning drives so that they drive the head of the machine through the position demand coordinates.

* * * * *